US011001392B1

(12) United States Patent
Kern

(10) Patent No.: US 11,001,392 B1
(45) Date of Patent: May 11, 2021

(54) SYSTEM OF HARDWARE AND SOFTWARE FOR DETERMINING THE WEIGHT AND CENTER OF GRAVITY LOCATION OF AN AIRPLANE OR OTHER VEHICLES, LIKE A FORKLIFT, TRUCK, AND MARITIME VESSEL

(71) Applicant: John Timothy Kern, Anderson, IN (US)

(72) Inventor: John Timothy Kern, Anderson, IN (US)

(*) Notice: Subject to any disclaimer, the term of this patent is extended or adjusted under 35 U.S.C. 154(b) by 0 days.

(21) Appl. No.: 17/086,542

(22) Filed: Nov. 2, 2020

Related U.S. Application Data

(60) Provisional application No. 62/933,487, filed on Nov. 10, 2019.

(51) Int. Cl.
| | |
|---|---|
| *B64D 45/00* | (2006.01) |
| *B64C 17/06* | (2006.01) |
| *H04W 4/80* | (2018.01) |
| *B64D 43/00* | (2006.01) |
| *G01G 19/00* | (2006.01) |
| *G01G 19/07* | (2006.01) |
| *G01G 19/08* | (2006.01) |

(52) U.S. Cl.
CPC ............ *B64D 45/00* (2013.01); *B64C 17/06* (2013.01); *B64D 43/00* (2013.01); *G01G 19/007* (2013.01); *G01G 19/07* (2013.01); *G01G 19/08* (2013.01); *H04W 4/80* (2018.02)

(58) Field of Classification Search
CPC ......... B64D 45/00; H04W 4/80; B64C 17/06; G01G 19/00; G01G 19/07; G01G 19/08; B60W 2040/1315

USPC ......................................................... 340/971
See application file for complete search history.

(56) References Cited

U.S. PATENT DOCUMENTS

| | | | |
|---|---|---|---|
| 2,443,045 A | 6/1948 | Magruder |
| 2,823,880 A | 2/1958 | Bergeson |
| 2,872,807 A | 2/1959 | Kolisch |
| (Continued) | | | |

FOREIGN PATENT DOCUMENTS

| | | | | |
|---|---|---|---|---|
| CN | 109632062 A | * | 4/2019 | |
| GB | 2405384 A | * | 3/2005 | ............. B64D 39/00 |
| (Continued) | | | | |

*Primary Examiner* — Atul Trivedi
(74) *Attorney, Agent, or Firm* — Ritchison Law Offices, PC; John D Ritchison

(57) ABSTRACT

A system of hardware and software for determining the weight and center of gravity location of an airplane or other vehicles, like a forklift, truck, maritime vessel. The same system could be used to determine stresses or movement on stationary structures is disclosed. This system employs commercially available, off the shelf or existing, proven, and inexpensive technology and utilizes empirical data. Further, it is designed as a supplemental check on calculated results, which are subject to data errors and are circumvented by this invention's equipment. The system includes a set of pressure and load, strain, bending, and/or other sensors, a voltage source, a voltmeter, a computer, a display, an empirically derived database, a temperature sensor, a set of switches, wireless transmission, and a power source that allows the system to be used for determining the weight and center of gravity location of an airplane or other vehicle.

20 Claims, 8 Drawing Sheets

(56) References Cited

U.S. PATENT DOCUMENTS

| | | | |
|---|---|---|---|
| 2,948,146 A | | 8/1960 | Bergeson |
| 3,182,498 A | | 5/1965 | Koletsky |
| 3,194,058 A | * | 7/1965 | Kurkjian ............... G01M 1/125 73/65.06 |
| 3,426,586 A | | 2/1969 | Kadlec |
| 3,584,503 A | | 6/1971 | Senour |
| 3,701,279 A | | 10/1972 | Harris et al. |
| 4,110,605 A | | 8/1978 | Miller |
| 4,463,428 A | | 7/1984 | Gilliam |
| 4,622,639 A | | 11/1986 | Adelson |
| 5,170,366 A | * | 12/1992 | Passarelli ................ G01G 9/00 702/41 |
| 5,214,586 A | | 5/1993 | Nance |
| 5,257,756 A | | 11/1993 | Patzig et al. |
| 5,258,582 A | | 11/1993 | Junginger |
| 5,521,827 A | | 5/1996 | Lindberg et al. |
| 5,548,517 A | | 8/1996 | Nance |
| 5,583,777 A | | 12/1996 | Power |
| 5,610,372 A | | 3/1997 | Phillips et al. |
| 6,032,090 A | | 2/2000 | Von Bose |
| 6,128,951 A | | 10/2000 | Nance |
| 6,193,190 B1 | | 2/2001 | Nance |
| 6,237,406 B1 | | 5/2001 | Nance |
| 6,237,407 B1 | | 5/2001 | Nance |
| 6,293,141 B1 | | 9/2001 | Nance |
| 6,353,793 B1 | | 3/2002 | Godwin et al. |
| 7,193,530 B2 | | 5/2007 | Nance |
| 7,274,309 B2 | | 9/2007 | Nance |
| 7,274,310 B1 | | 9/2007 | Nance |
| 7,281,418 B2 | | 10/2007 | Mardirossian |
| 7,967,244 B2 | | 6/2011 | Long et al. |
| 8,042,765 B1 | | 10/2011 | Nance |
| 8,060,296 B2 | | 11/2011 | Vetsch |
| 8,180,504 B1 | | 5/2012 | Nance |
| 8,515,627 B2 | | 8/2013 | Marathe et al. |
| 8,543,322 B1 | | 9/2013 | Nance |
| 8,565,965 B2 | | 10/2013 | Nance |
| 9,096,314 B2 | * | 8/2015 | Brotherton-Ratcliffe ................... B64D 27/10 |
| 9,927,319 B2 | | 3/2018 | Nance |
| 2010/0198491 A1 | * | 8/2010 | Mays ................... B60W 30/09 701/124 |
| 2014/0277923 A1 | * | 9/2014 | Kaufmann ............ B64D 25/20 701/33.4 |
| 2015/0298706 A1 | * | 10/2015 | Hall ........................ G01G 19/14 701/37 |
| 2016/0327425 A1 | * | 11/2016 | Gagas ..................... G01C 9/06 |
| 2017/0324817 A1 | * | 11/2017 | Oliveira ................. H04L 67/10 |
| 2018/0111619 A1 | * | 4/2018 | Hall ...................... B60W 10/184 |
| 2019/0219437 A1 | * | 7/2019 | Gago Tripero ......... G01L 1/225 |
| 2019/0224935 A1 | * | 7/2019 | Waite ................... B30B 9/3007 |
| 2019/0291883 A1 | * | 9/2019 | Atamanov .............. B64C 27/08 |
| 2020/0354170 A1 | * | 11/2020 | Priest ....................... B64F 1/32 |
| 2021/0031940 A1 | * | 2/2021 | Guida ..................... B64C 15/00 |

FOREIGN PATENT DOCUMENTS

| | | | | |
|---|---|---|---|---|
| KR | 20150142662 A | * | 12/2015 | |
| RU | 2422782 C1 | * | 6/2011 | |
| WO | WO-9114931 A1 | * | 10/1991 | ............ G01M 1/125 |
| WO | WO-2015164246 A1 | * | 10/2015 | ................ G01P 3/00 |
| WO | WO-2017216972 A1 | * | 12/2017 | ............. B64C 39/02 |

* cited by examiner

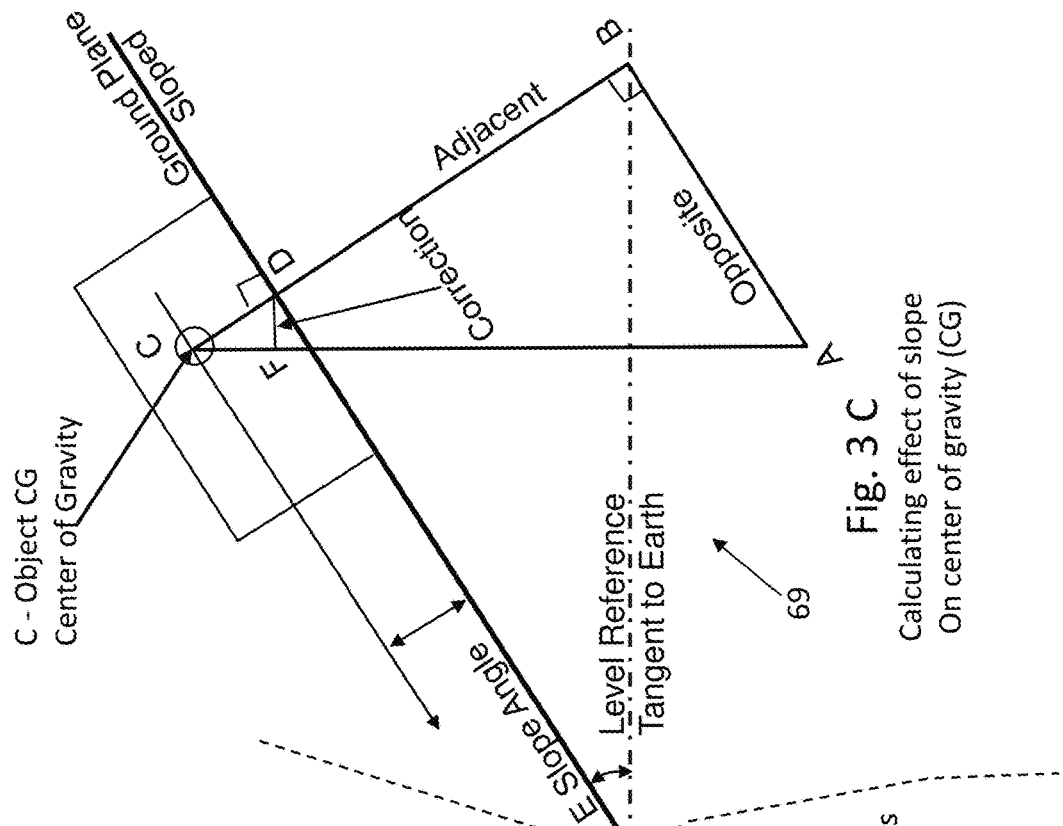
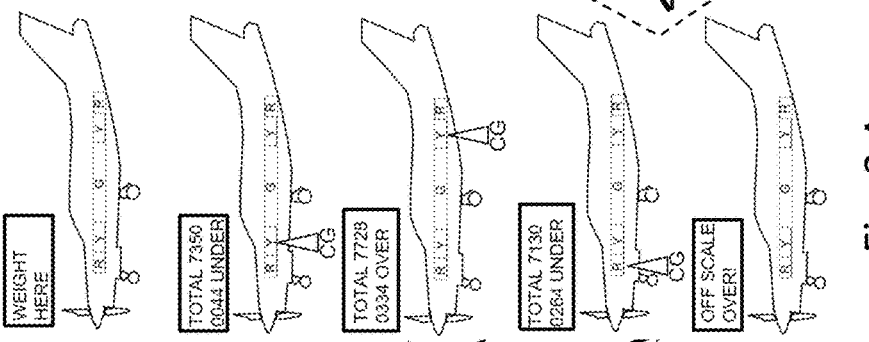

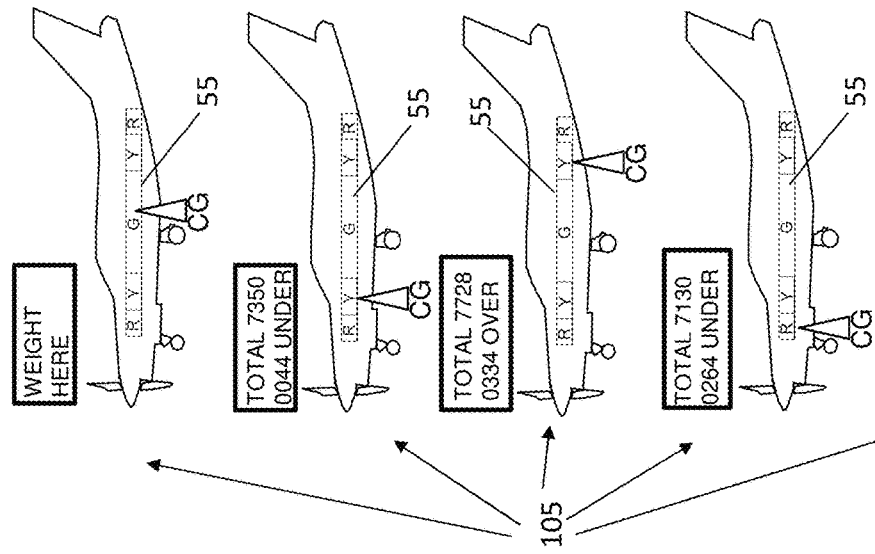
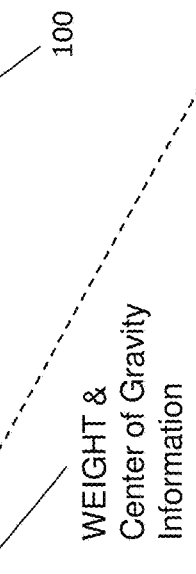
Fig. 4 A
Fig. 4 B

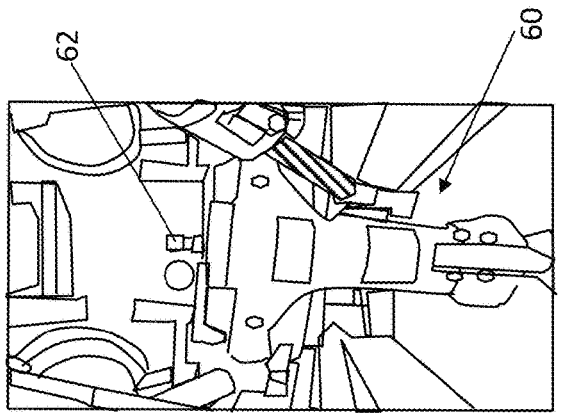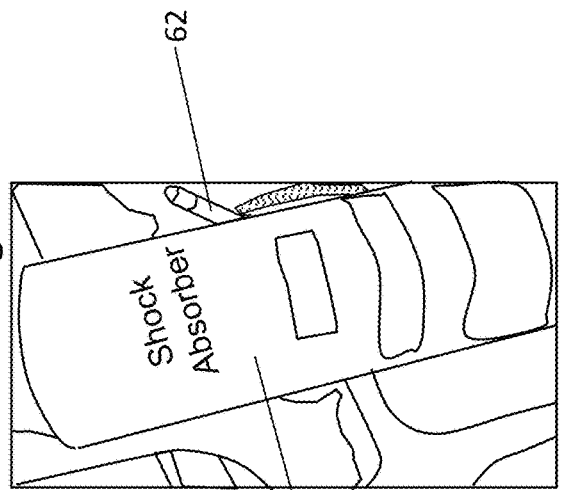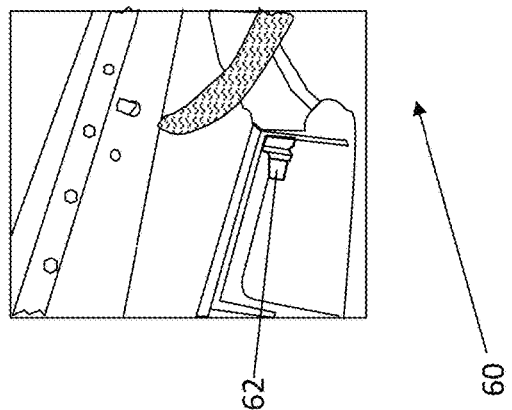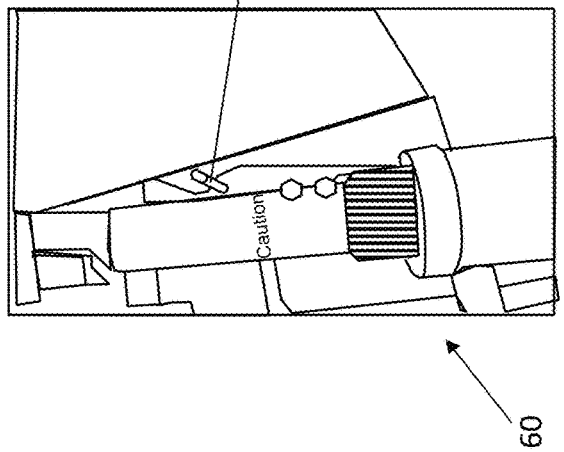
Fig. 6A  Fig. 6B  Fig. 6C  Fig. 6D  Fig. 6E

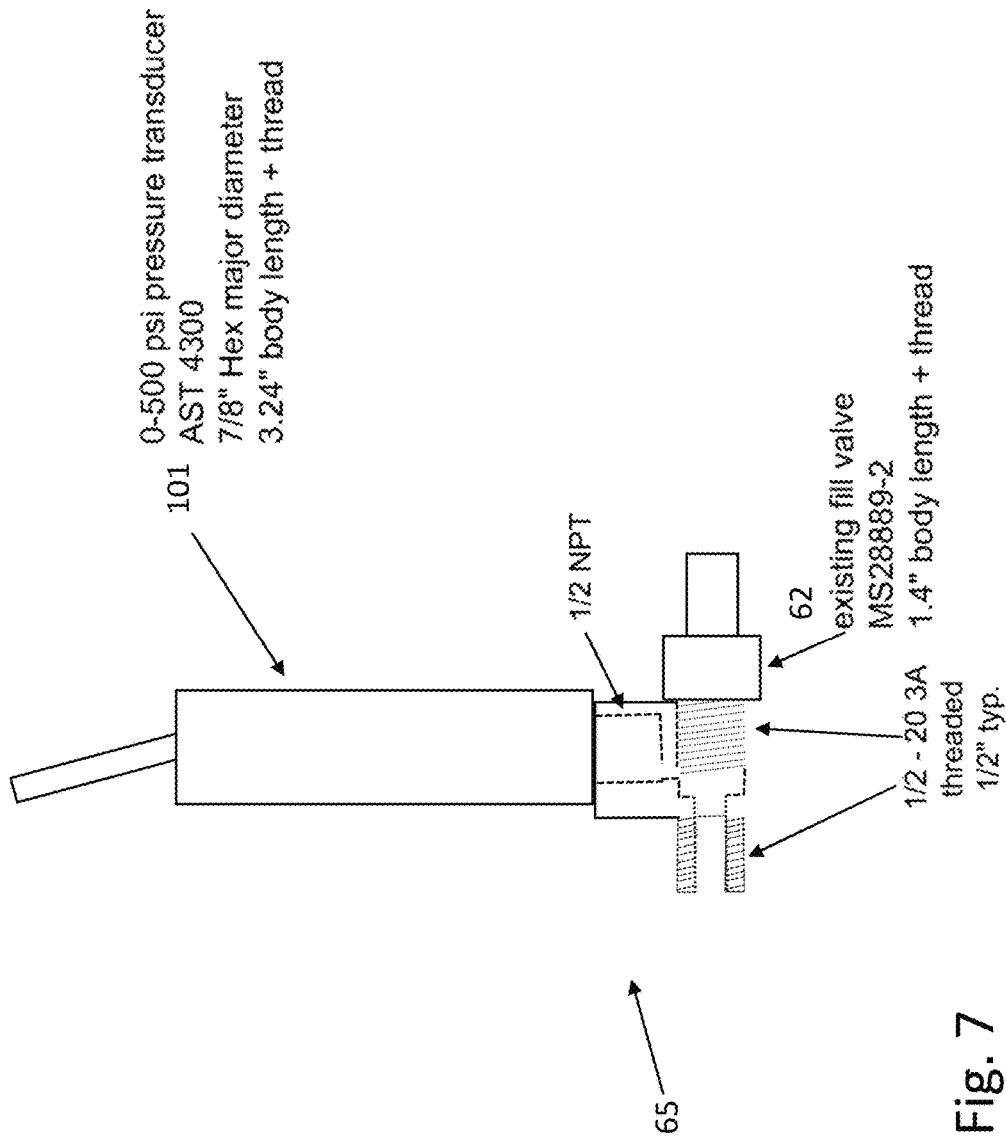

*Anchorage Daily News © 2010*

*Anchorage Daily News © 2010*

SYSTEM OF HARDWARE AND SOFTWARE FOR DETERMINING THE WEIGHT AND CENTER OF GRAVITY LOCATION OF AN AIRPLANE OR OTHER VEHICLES, LIKE A FORKLIFT, TRUCK, AND MARITIME VESSEL

CROSS-REFERENCE TO RELATED APPLICATIONS

This application claims the benefit of U.S. Provisional Patent Application with Ser. No. 62/933,487 filed Nov. 10, 2019, by John Timothy Kern. The application is entitled "System of hardware and control software for determining the weight and center of gravity location of an airplane or other vehicles, like a forklift, truck, and maritime vessel".

FIELD OF INVENTION

This invention relates to a system of hardware and software for determining the weight and center of gravity location of an airplane or other vehicles, like a forklift, truck, and maritime vessel. A system needs to help determine and analyze the critical factors. Among critical factors that the pilot of an aircraft must consider when determining if the aircraft is safe for takeoff and flight are identifying the actual weight and center of gravity (CG) for the aircraft. Aircraft CG is a critical factor in flight operations. If the aircraft CG is too far aft and outside the aircraft's design CG limits, the aircraft nose can rise uncontrollably during takeoff and the aircraft can become unstable, resulting in a stall and possible crash. If the center of gravity is too far forward, the airplane cannot point up and leave the runway, or may not be able to climb or maintain altitude satisfactorily. In sum, should the center of gravity be either too far forward or too far aft, even if the airplane should become airborne, the airplane will not achieve adequately controllable flight.

The present invention relates to on-board aircraft weight and balance systems (WBS) that require a multitude of precision sensors (usually one or more per wheel location) plus temperature and angle sensors and historically resulting in a system too expensive, and especially too imprecise or unreliable to be practical for aircraft. This invention relates to a system and/or method for measuring the total weight of passengers and luggage on an aircraft, cargo, and fuel and/or for measuring the weight distribution of an aircraft.

FEDERALLY SPONSORED RESEARCH

None.

SEQUENCE LISTING OR PROGRAM

None.

BACKGROUND

Field of Invention and Prior Art

As far as known, there are no functional systems of hardware and software for determining the weight and center of gravity location of an airplane employed in general aviation or in other vehicles, like a forklift, truck, and maritime vessel or the like in use or production. It is believed that this system is unique in its design and technologies.

In aviation, safety is the sine qua non, the necessary criterion. An innovation that enhances safety is inherently important. BUT . . . A safety enhancement that diminishes performance always requires regulation for its implementation and decreases utility; acceptance suffers. A complicated innovation may be misused, misinterpreted, or ignored. Then it is of no use—at best. A safety enhancement that is overly expensive will not much help the flying community or the industry. And if it does not work on the pilot's airplane, it does not help the pilot. Three characteristics are paramount: Simplicity. Compatibility. Affordability. This invention addresses all these concerns and meets these requirements.

Modern aircraft are equipped with a generous assortment of sensors and instrumentation to facilitate operation of the aircraft. Nearly every parameter critical to safe and efficient operation is accurately monitored in real time, with one notable exception. The gross weight and longitudinal center of gravity, both critical to safe and efficient operation, are based on a variety of inputs, which include a mixture of predetermined "known" values, measured values, the pilots' observations and estimates, and estimates based on statistical sampling. The Load and Trim Sheet, or Manifest, is the outcome of the load planning process that utilizes these inputs. Although the load planning process is highly controlled, there are opportunities for undetected errors. In addition, even if the load plan is perfect, the actual loading process can introduce errors that cannot be detected without a real-time measurement of the "as loaded condition" of the aircraft. The few on-board aircraft weight and balance systems (WBS) that have been tried required a multitude of precision sensors (usually one or more per wheel location) historically resulting in a system that was not just imprecise and unreliable, but also too expensive to be practical. Also, none of the prior art included this invention's automatic compensation for temperature changes and for inclination of the ground on which the aircraft was measured.

Weight and Balance (position of the Center of Gravity) must be calculated prior to every flight, but data are often unreliable: the estimate of quantity of fuel on board or loaded may be inaccurate; luggage and cargo weights may be mistakenly estimated; unexpected passengers or luggage may appear moments before scheduled takeoff; passengers may move from their assigned seats; and yes, passengers have been known to understate their weights (and rarely do they know their actual, all-up weights, in any event). A man known to a friend of the inventor killed his 4-year-old son and burned up his wife, his other son, their babysitter, and himself, in a totally preventable overweight and aft-CG accident. (Jul. 1, 2010, Anchorage, Ak.). Yes, the commercial-rated pilot should have known better, but his innocent and trusting passengers deserved better. FACT: The airplane will not fly well if it is overweight, and it will be over-stressed; and it will not fly under control or possibly at all if its Center of Gravity (CG) is out-of-limits. That is why Weight & Balance calculations are essential and required before every flight. One typical Pilot Information Manual contains over sixteen (16) pages of information about how to make these calculations, and this Weight & Balance Indicator provides a quick and accurate check on the calculations. This simple, inexpensive, lightweight Weight & Balance Indicator which is the invention presented herein will give the pilot accurate, real-time information on aircraft loading and Center of Gravity (CG) position. With a known wheelbase, the CG is found by comparing the weight on the nose wheel to the total weight of the airplane: all the information a pilot needs rests on three landing struts, and this invention can extract it and compile it in a useful fashion.

The Federal Aviation Regulations (FARs) cover the requirements for Weight and Balance compliance in several sections. Among them:

Sec. 25.1519—Weight, center of gravity, and weight distribution. The airplane weight, center of gravity, and weight distribution limitations determined under §§ 25.23 through 25.27 must be established as operating limitations.

AND

Sec. 27.1519—Weight and center of gravity. The weight and center of gravity limitations determined under §§ 27.25 and 27.27, respectively, must be established as operating limitations.

Compliance with the weight and balance parameters established for certification is mandatory, and evidence of compliance must be produced for authorities on demand, for all flights. But many pilots do only an informal "guesstimate" of loading, often with negative results: The National Transportation Safety Board (NTSB) issued Safety Alert 072 ("Minding Weight, Maintaining Balance") in February, 2018, that noted, "Between 2006 and 2016, the probable causes of 136 general aviation (GA) accidents were related to pilots improperly conducting preflight performance calculations for weight and balance or not conducting them at all. One-third of these accidents resulted in pilot and/or passenger deaths." In 2006, according to the National Aerospace Laboratory (NAL) (Report Number NLR-TP-2007-153), "The majority (more than 90%) of weight and balance problems identified in this paper could be eliminated if there was a system available to the flight crew that would do an automatic onboard weight and balance assessment."

The NAL study also mentioned, "However the accuracy and reliability of such systems is currently insufficient to enforce the use of these systems on commercial aircraft as primary means for determining the weight and balance." The FAA publication, "Aircraft Weight and Balance Handbook," (FAA-H-8083-1B[3]) is a good, 114-page summary of both the importance of proper weight and balance, as well as the pilot's responsibility in assuring that design specifications are met, on every flight. A useful summary of "The 7 Most Common Weight and Balance Mistakes" is found here [https://www.boldmethod.com/blog/lists/2020/07/7-most-common-weight-and-balance-mistakes/], and this invention addresses all of them:

1) Using improper weight and balance information: When determining the weight and balance for an aircraft, it is crucial that one uses the weight and balance for the specific aircraft. Weights between a generic POH [Pilot's Operating Handbook] and the specific aircraft POH could be considerably different. This invention uses data specific to the aircraft on which it is used.
2) Math errors: If one is using the computational method to determine weight and balance, it is important that a person double checks his or her calculations. A simple miscalculation could put the calculation out of weight and balance limits. This invention requires no human computation.
3) Only knowing one method to determine weight and balance Different aircraft manufacturers will provide various methods to compute weight and balance. These include graphs, tables, and the general computational method. If one needs to calculate weight and balance for an aircraft that is not familiar, the person can be using a different method than what one is familiar with. This invention does not rely on choice of methodology of the pilot or loadmaster, and thus eliminates misuse or confusion.
4) Overloading the aircraft: Not taking maximum gross weight seriously can have adverse effects on flight characteristics. More importantly, max gross weight is not a performance limitation, it is a structural limitation. One may have the performance to take off, but the airframe may not be strong enough to handle turbulence and G-loading. This invention provides the pilot with the actual weight (unaffected by incorrect estimates or measurements or calculations) and displays the specific aircraft's actual weight and MTOW [Maximum Take Off Weight—the design limit].
5) Rounding weights: Try to be as accurate as possible with determining the weights of various items that may be on board. Doing so could prevent accidentally flying an overweight aircraft that one thought was within weight and balance. In this invention, no weights are estimated, so there are no errors of this type.
6) "My plane can fly with more weight!": If a person/pilot thinks that crashes related to weight and balance errors "happen to other people," that person may be setting him/herself up for a bad situation. This is a judgment call. While this invention cannot override poor judgment, it does provide correct information, and will deliver a warning.
7) Forgetting to convert: When one calculates weight and balance, one needs to remember that fuel will be given in gallons, and it is the calculator's responsibility to convert gallons to pounds. Forgetting to do so may put the computed weight and balance of the calculation off by hundreds of pounds. This invention uses and displays consistent units and allows no human input, eliminating the opportunity to introduce conversion errors.

"STAN" systems (Sum Total, Aft and Nose) have been proposed since the 1930s, but none has had the benefit of the simple, reliable, affordable, and practical components and computing power now available, and although some of these systems have been incorporated in aircraft, none has proven desirable, due to these shortcomings. The last serious attempt at the incorporation of such systems in commercial airliners was on a Boeing 707-300, in 1975 (STC SA208NW).

Problem Solved

An airplane is overstressed and flies poorly when it is overweight, and it cannot fly under full control when it is out of balance. This system informs the pilot of either condition, prior to flight. This invention provides a reliable and instant check of the aircraft's weight and balance and requires no input from or calculation by the pilot or any crewman. It thus eliminates human error and serves as a "sanity check" against the pilot's calculations or inputs into the aircraft's onboard W&B calculator.

Rarely have the most-modern enhancements been both affordable and backward-compatible. This upgrade is. This Weight & Balance Indicator represents a significant safety and performance enhancement that will give an airplane or airline using this a competitive advantage over their competition.

PRIOR ART

Many applications (apps) and calculators are available, both in onboard systems and as stand-alone Weight & Balance (W&B) Calculators. These apps require someone's (usually the pilot's) inputting the aircraft's configuration, fuel on board, plus passenger and luggage weights and positions within the airplane. All such data and computations are subject to imprecise data or data-entry mistakes. This current invention requires no human data input. Further, it compensates to a large degree for normal wear and deferred inspection or maintenance of the landing gear struts and components. The few W&B devices that have been envisioned have run into complication, lack of reliability, and expense, plus often the size and weight of the components of previous efforts have kept them from implementation. Importantly, none of the existing art incorporates all the safeguards and technology of this invention. This system employs Commercial Off-The-Shelf (COTS) technology and uses both design and empirical data. It is designed as a supplemental check on the required calculated results of the regulatory agencies, which are subject to data errors that are circumvented by this invention's equipment.

Even commercial airlines, with their "standard weights," make mistakes. Reuters reported on Jan. 10, 2020, "The U.S. Federal Aviation Administration (FAA) said on Friday it is seeking to impose a $3.92 million fine on Southwest Airlines Co (LUV.N) for alleged weight infractions on 21,505 flights on 44 aircraft between May 1, 2018 and Aug. 9, 2018: "The FAA alleged that Southwest operated the flights with incorrect operational empty weights, and center of gravity or moment data, which is used to determine how many passengers and how much fuel can be safely carried and where cargo should be located."

A novelty search shows that no prior art accomplishes what this system of hardware and software for determining the weight and center of gravity location of an airplane or other vehicles, like a forklift, truck, and maritime vessel provides. Prior art includes:

| No. | Pat. No. | Applicant | Title | Year |
|---|---|---|---|---|
| 1 | 9927319 | Nance | Method for determining aircraft center of gravity independent of measuring the aircraft weight | 2018 |
| 2 | 8565965 | Nance | Aircraft landing gear automated inspection for presence of internal oxygen contamination | 2013 |
| 3 | 8543322 | Nance | Methods for determination of optimum sequence for automated activation of onboard aircraft weight and balance system | 2013 |
| 4 | 8180504 | Nance | Aircraft landing gear compression rate monitor and method to increase aircraft landing weight limitation | 2012 |
| 5 | 8060296 | Vetsch | Low cost aircraft center of gravity monitoring systems and methods | 2011 |
| 6 | 8042765 | Nance | Aircraft landing gear compression rate monitor | 2011 |
| 7 | 7967244 | Long et al | Onboard aircraft weight and balance system | 2011 |
| 8 | 8515627 | Marathe | Method and apparatus for calculating payload weight | 2009 |
| 9 | 7281418 | Mardirossian | System and method of measuring weight of passengers and luggage, and weight distribution of aircraft | 2007 |
| 10 | 7274310 | Nance | Aircraft landing gear kinetic energy monitor | 2007 |
| 11 | 7274309 | Nance | Aircraft landing gear initial touch-down velocity monitor | 2007 |
| 12 | 7193530 | Nance | Aircraft landing gear automated inspection and life limitation escalation system and method | 2007 |
| 13 | 6353793 | Godwin et al | System and apparatus for determining the center of gravity of an aircraft | 2002 |
| 14 | 6293141 | Nance | Method of determining status of aircraft landing gear | 2001 |
| 15 | 6237407 | Nance | Aircraft weight and center of gravity indicator | 2001 |
| 16 | 6237406 | Nance | Aircraft weight and center of gravity indicator | 2001 |
| 17 | 6193190 | Nance | Aircraft vertical landing system | 2001 |
| 18 | 6128951 | Nance | Aircraft weight and center of gravity indicator | 2000 |
| 19 | 6032090 | von Bose | System and method for on-board determination of aircraft weight and load-related characteristics | 2000 |
| 20 | 5610372 | Phillips | System for measuring total weight and weight distribution of a vehicle | 1997 |
| 21 | 5583777 | Power | Method and apparatus for determining the weight and center of gravity of a vehicle, particularly an aircraft | 1996 |
| 22 | 5548517 | Nance | Aircraft weight and center of gravity indicator | 1996 |
| 23 | 5521827 | Lindberg | On-board aircraft weighting and center of gravity determining apparatus and method | 1996 |
| 24 | 5258582 | Junginger | Apparatus and method for weighing aircraft | 1993 |
| 25 | 5257756 | Patzig et al | Arrangement of sensors on the landing gear of an aircraft for measuring the weight and position of center of gravity of the aircraft | 1993 |
| 26 | 5214586 | Nance | Aircraft weight and center of gravity indicator | 1993 |
| 27 | 4463428 | Gilliam | Aircraft weight and center of gravity cockpit readout system | 1984 |
| 28 | 4110605 | Miller | Weight and balance computer apparatus for aircraft | 1978 |
| 29 | 3701279 | Harris et al | Aircraft weight and center of gravity indicator system | 1972 |
| 30 | 3584503 | Senour | Aircraft weight and center of gravity determination system which includes alarm, self-checking, and fault override circuitry | 1971 |
| 31 | 7193530 | Elfenbein | Aircraft landing gear automated inspection and life limitation escalation system and method | 2007 |
| 32 | 3426586 | Kadlec | Aircraft weight measurements | 1969 |
| 33 | 3182498 | Koletsky | Aircraft takeoff monitor | 1965 |
| 34 | 2948146 | Bergeson | Center of gravity indicator | 1960 |
| 35 | 2823880 | Bergeson | Aircraft fuel load center of gravity control means | 1958 |
| 36 | 4622639 | Adelson | Aircraft center of gravity and fuel level advisory system | 1983 |
| 37 | 2872807 | Kolisch | Equipment for determining the center of gravity of an aircraft | 1954 |
| 38 | 2443045 | Magruder | Strain gauge center of gravity and gross weight meter | 1948 |

As can be observed, none of the prior art has anticipated or caused one skilled in the art of systems for determining center of gravity for aircraft and other structures to see this new invention by John Timothy "Tim" Kern as obvious to a person skilled in the ordinary art of the industry. The system and simple device using pressure readings from struts provides an answer to the need for a quick and simple cross-check of the location of weight and resultant center of gravity for the structure.

SUMMARY OF THE INVENTION

This invention is a system of hardware and software for determining the weight and center of gravity location of an airplane or other vehicles, like a forklift, an over the road truck, an off the road construction vehicle, and a maritime vessel. After the aircraft is loaded and has traveled on the ground (for a few seconds or longer) from its final loaded position, the pilot queries the system, and is informed of the total weight of the aircraft and the position of its longitudinal (fore-and-aft) center of gravity. Since the pilot has already used legacy methods required by regulators to calculate this information, this system serves as a check on the pilot's data and calculations and to alert the pilot to anomalies therein.

The preferred embodiment of a system of hardware and software for determining the weight and center of gravity location of an airplane or other vehicles, like a forklift, truck, and maritime vessel is comprised of: (a) a set of pressure and load measurement components (such as pressure and/or load transducers on hydraulic struts), or load cells or strain gauges (on spring gear); (b) level/tilt and temperature sensors; (c) a voltage source; (d) a voltmeter (can be integrated); (e) a computer; (f) a means for communication with and alerting a responsible person (may be a smartphone, tablet, electronic flight bag (EFB)), or dedicated, shared or discrete monitor/display; may be enhanced with an audio or other visual or tactile warning such as a "stick-shaker" in an aircraft); (g) a design and empirically derived database; (h) a temperature sensor; (i) a (set of) switch(es):level sensor/switch, landing gear up/down switch (can be separately commanded, but is best if integrated into the existing gear up/down switch or is triggered by the physical retraction of the gear), and a switch to query for the weight and balance calculation and display; (j) a control interconnection of the components wired or wireless (Bluetooth, Wi-Fi, sonic, and infrared interconnections, or other) transmission from the data points (the pressure transducers and/or strain gauges, etc.) to the computer could be employed, to make installation less-invasive on the airframe and avoid problems with wires; and (k) an independent power source (e.g., another small battery) at the transmission point wherein the system hardware and software can be used for determining the weight and center of gravity location of an airplane or other vehicle, like a forklift, an over the road truck, an off the road construction vehicle, and a maritime vessel. The aircraft's parameters (or other necessary data, in other applications) are required for setup and whenever major changes are made. E.g., wheelbase, static center of gravity's height above the ground, MTOW, empty weight, and the design limits (at various weights) of the center of gravity's allowable range.

The newly invented system of hardware and software for determining the weight and center of gravity location can be manufactured at low volumes by very simple means and in high volume production by more complex and controlled systems.

Objects and Advantages

There are several objects and advantages of the system of hardware and software for determining the weight and center of gravity location of an airplane or other vehicles, like a forklift, an over the road truck, an off the road construction vehicle, and a maritime vessel. There are currently no known systems for determining the weight and center of gravity location of an airplane or other vehicles that are effective at providing the objects of this invention.

The various advantages and benefits are:

| Item | Advantages |
| --- | --- |
| 1 | The effective display conveys useful information to the pilot |
| 2 | The information on the display is accurate and rapidly presented to the pilot |
| 3 | The depiction of an exemplar aircraft in silhouette along with a display of the actual measured weight of the aircraft and the universally-recognized colors (RED - out of range, YELLOW - caution but acceptable, and GREEN - acceptable/go) and relative positions of the Center of Gravity (CG) give the pilot an instant and visual check on calculations, and verify that the information used in those calculations (e.g. passenger weight, baggage and cargo weights, weight of fuel on board, etc.) have yielded the expected results. (This "display" can be simplified or reduced to simple text or audio for a more-compact application and code, without reducing the value of the information to the pilot.) |
| 4 | There is an immediate identification of any loading problems which allows adjustments of weight or fore and aft relocation of passengers, luggage, or cargo |
| 5 | There is afforded a chance to optimize existing weight placement (passenger [PAX] or cargo) for maximum efficiency |
| 6 | There is a discernable additional check on fuel quantity in the event of a fuel gauge malfunction or line equipment error |
| 7 | This invention uses data specific to the aircraft on which it is used. |
| 8 | This invention requires no human computation or data input (by pilot or other). |
| 9 | This invention does not rely on choice of methodology of the pilot or loadmaster, and thus eliminates misuse or confusion. |
| 10 | This invention provides the pilot with the actual weight (unaffected by incorrect estimates or measurements or calculations) and displays the specific aircraft's actual weight and MTOW [Maximum Take Off Weight - the design limit]. |
| 11 | No weights are estimated; there are no significant or meaningful errors of this type. |
| 12 | The decision to fly, even when weight and balance are known and out of specification, is a judgment call. While the program cannot override poor judgment, it does provide correct information, and will display and/or sound a warning. [Note: a circuit that would interfere with the aircraft's ignition system and prevent any but taxi ("limp home") power was contemplated, but the idea of interfering with such a system especially on an aircraft would no doubt be rejected by the certification agencies, and was therefore removed from the specification.] |
| 13 | This invention uses and displays consistent units, without the opportunity for anyone to introduce conversion errors. [The limits and units of measure are set at the time of installation of the system and cannot be altered by the user.] |

Finally, other advantages and additional features of the present system of hardware and software for determining the weight and center of gravity location of an airplane or other vehicles will be more apparent from the accompanying drawings and from the full description of the device. For one skilled in the art of Center of Gravity and Weight and Balance systems, it is readily understood that the features shown in the examples with this system are readily adapted to other types of Center of Gravity and weight balance requirements in other types of vehicles.

DESCRIPTION OF THE DRAWINGS—FIGURES

The accompanying drawings, which are incorporated in and constitute a part of this specification, illustrate an embodiment of the system of hardware and software for determining the weight and center of gravity location of an airplane or other vehicles that is preferred. The drawings together with the summary description given above and a detailed description given below explain the principles of the system. It is understood, however, that the system of hardware and software for determining the weight and center of gravity location of an airplane or other vehicles, like a forklift, an over the road truck, an off the road construction vehicle, and a maritime vessel is not limited to only the precise arrangements, equipment, and instrumentalities shown.

FIGS. 3A through 3C are sketches of displays showing the system results in a visual and audible form.

FIG. 4A is an enlarged view of a possible display and FIG. 4B shows the advantages of the system.

FIGS. 6A through 6E are sketches of actual aircraft struts where the system sensors and controls will gather empirical data of the aircraft weights.

FIG. 7 is a sketch of a conceptual adaptor which would plumb the pressure transducer into an existing strut at the tapped hole for the existing fill valve for the system of hardware and software for determining the weight and center of gravity location of an airplane or other vehicles.

DESCRIPTION OF THE DRAWINGS—REFERENCE NUMERALS

Figure 1C:
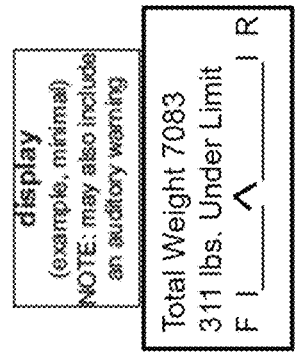
FIGS. 1A through 1C show sketches of the general system of hardware and software for determining the weight and center of gravity location of an airplane or other vehicles, like a forklift, truck, and maritime vessel and optional displays.

The following list refers to the drawings:

TABLE

Reference numbers

| Ref # | Description |
|---|---|
| 101 | Pressure transducers 101 (pressure and load measurement components such as pressure and/or load on hydraulic struts), or load cells 101A, or strain gauges (not shown) 101B (on spring gear) |
| 102 | Voltage source (battery or other) 102 |
| 103 | Voltmeter 103 (can be integrated) |
| 104 | computer 104 |
| 105 | means for communication with and alerting a responsible person 105 (may be a smartphone, tablet, electronic flight bag (EFB), portable monitor, or dedicated or shared display monitor; can be enhanced or partially or totally replaced with an audio, other visual/optical/photographic, or tactile warning such as a "stick-shaker" in an aircraft. |
| 105A | Display 105A is a minimum-configuration display 105A |
| 106 | Database 106 (best derived empirically), which is compared to host vehicle-specific information entered at setup |
| 107 | Temperature sensor 107 |
| 108 | switch 108 to query for the weight and balance calculation and display 105 |
| 109 | Level sensor/switch 109 |
| 110 | Landing gear up/down switch 110 (can be separately or otherwise commanded, but is best if integrated into the existing gear up/down switch or is triggered by the physical retraction of the gear) |
| 111 | a control interconnection of the components 111 - Wireless (Bluetooth, Wi-Fi, sonic, visual/optical/photographic, and infrared interconnections, or other) transmission 111 from the data points (the pressure transducers 101 or strain gauges 101B etc.) of the computer could be employed to make installation less invasive on the airframe and avoid problems with wires. Such an option may also include an additional power source (e.g. another battery) at the transmission point. |
| 30 | A system 30 of hardware and software for determining the weight and center of gravity location of an airplane or other vehicles, like a forklift, an over the road truck, an off the road construction vehicle, and a maritime vessel. |
| 48 | demonstrator electrical mock-up/prototype 48 |
| 49 | demonstrator pneumatic mock-up/prototype 49 |
| 50 | demonstrator aircraft 50 |
| 51 | pneumatic cylinders (surrogates for struts) 51 for demonstration |
| 52 | mechanical crank 52 varies pressure for demonstration |
| 55 | display 55 of the actual measured weight of the aircraft and the universally-recognized colors (RED - Out of Range, YELLOW - caution, going out of CG range but acceptable, and GREEN - acceptable/go) and relative positions of the Center of Gravity (CG) give the pilot an instant and visual check on calculations, and verify that the results arrived at in those calculations (e.g. aircraft weight at that moment and location of the CG) are correct |
| 57 | pressure gauge 57 |
| 60 | aircraft struts 60 of various configurations; Struts (structural members) 60 at the wheels 67 and tires 67A |
| 61 | strut information tag 61 |
| 62 | strut fill valve and cap 62 |
| 65 | conceptual strut (occupies blank space); adaptor [shown] threads into strut) 65 and transducers 101, 101A, 101B ("AST 4300" is merely an example of one possible pressure transducer; part number, location, and dimensions may differ) |
| 66 | Aircraft 66 |
| 67 | Main aircraft wheels and tires 67 normally located near center of gravity |
| 67A | Nose wheels and tires 67A normally located under the nose of the aircraft (Measurement may also be taken at tailwheel on aircraft so equipped) |
| 68 | Main battery(batteries) 68, 102 or voltage source for the electrical system of the aircraft 66 |
| 69 | Calculating 69 effect of slope E On center of gravity (COG) |
| 70 | air disaster crash 70 afterward determined to be result of weight and balance exceedance problems |
| 100 | Advantages 100 of the system of hardware and software for determining the weight and center of gravity location of an airplane or other vehicles 30 |
| E | Slope angle E |
| F | Correction line FD due to slope angle E |

DETAILED DESCRIPTION OF PREFERRED EMBODIMENT

The present development relates to a system of hardware and software for determining the weight and center of gravity location of an airplane or other vehicles, like a forklift, truck, and maritime vessel. A system needs to help determine and analyze the critical factors. Critical factors that the pilot of an aircraft must consider when determining if the aircraft is safe for takeoff are identifying the proper weight and center of gravity (CG) for the aircraft. Aircraft CG is a critical factor in flight operations. If the aircraft CG is too far aft and outside the aircraft's certified CG limits, the aircraft nose can rise uncontrollably during takeoff or in flight, where the aircraft will become unstable, resulting in a stall and possible crash. The present invention relates to on-board aircraft weight and balance systems (WBS) that require a multitude of precision sensors (usually one or more per wheel location) and historically resulting in a system that is unreliable and too expensive to be practical. This invention relates to a system and/or method for measuring the total weight of passengers and luggage on an aircraft, cargo, and fuel and/or for measuring the weight distribution of an aircraft.

The advantages for the system of hardware and software for determining the weight and center of gravity location of an airplane or other vehicles 30 are listed above in the introduction. Succinctly the benefits are that the device:

A. The effective display conveys useful information to the pilot;
B. The information on the display is accurate and rapidly presented to the pilot;
C. The depiction of an exemplar aircraft 50 in silhouette along with display 55 of the actual measured weight of the aircraft and the universally-recognized colors (RED—Out of Range, YELLOW—caution, going out of CG range but acceptable, and GREEN-acceptable/go) and relative positions of the Center of Gravity (CG) give the pilot an instant and visual check on calculations, and verify that the results arrived at in those calculations (e.g. aircraft weight at that moment and location of the CG) are correct;
D. There is an immediate identification of any loading problems which allows adjustments of weight or fore and aft relocation of passengers;
E. There is afforded a chance to optimize existing weight placement (passenger [PAX] or cargo) for maximum efficiency; and
F. There is an additional discernable check on fuel quantity in the event of a fuel gauge malfunction or line equipment error.
G. This invention uses data specific to the aircraft on which it is used.
H. This invention requires no human computation or data input (by pilot or other).
I. This invention does not rely on choice of methodology of the pilot or loadmaster, and thus eliminates misuse or confusion.
J. This invention provides the pilot with the actual weight (unaffected by incorrect estimates or measurements or calculations) and displays both the specific aircraft's actual weight and MTOW [Maximum Take Off Weight—the design limit].
K. No weights are estimated and there are no significant or meaningful errors.
L. The decision to fly, even when weight and balance are known and out of specification, is a judgment call. While the program cannot override poor judgment, it does provide correct information, and will display and/or sound a warning. [Note: a circuit that would interfere with the aircraft's ignition system and prevent any but taxi power was contemplated, but the idea of interfering with such a system especially on aircraft would no doubt be rejected by the certification agencies, and was therefore removed from the specification.]
M. This invention uses and displays consistent units, without the opportunity for anyone to introduce conversion errors.

The preferred embodiment of a system of hardware and software for determining the weight and center of gravity location of an airplane or other vehicles, like a forklift, truck, and maritime vessel is comprised of: (a) a set of pressure (pressure and load measurement components such as pressure and/or load transducers on hydraulic struts), or load cells or strain gauges (on spring gear); (b) level/tilt and temperature sensors; (c) a voltage source; (d) a voltmeter (can be integrated); (e) a computer; (f) a means for communication with and alerting a responsible person (may be a smartphone, tablet, electronic flight bag (EFB), portable monitor, or dedicated or shared display/monitor; may be enhanced with or replaced by an audio, other visual/photographic/optical, or tactile warning such as a "stick-shaker" in an aircraft); (g) an empirically derived database; (h) a temperature sensor; (i) a set of switch(es):level sensor/switch, landing gear up/down switch (can be separately commanded, but is best if integrated into the existing gear up/down switch or is triggered by the physical retraction of the gear), and a switch to query for the weight and balance calculation and display; (j) a control interconnection of the components—wireless (Bluetooth, Wi-Fi, sonic, and infrared interconnections, or other) transmission from the data points (the pressure transducers and/or strain gauges, etc.) to the computer could be employed, to make installation less-invasive on the airframe and avoid problems with wires; and (k) an independent power source (e.g., another small battery, a discrete battery, or an inductive source) at the transmission point wherein the system hardware and software can be used for determining the weight and center of gravity location of an airplane or other vehicle, like a forklift, an over the road truck, an off the road construction vehicle, and a maritime vessel.

There is shown in FIGS. 1-8 a complete description and operative embodiment of the system of hardware and software for determining the weight and center of gravity location of an airplane or other vehicles, like a forklift, truck, and maritime vessel. In the drawings and illustrations, one notes well that the FIGS. 1-8 demonstrate the general configuration and use of this product. The various example uses are in the operation and use section, below. The drawings together with the summary description given above and a detailed description given below serve to explain the principles of the system 30 of hardware and software for determining the weight and center of gravity location of an airplane or other vehicles. It is understood, however, that the system is not limited to only the precise arrangements, equipment, and instrumentalities shown to be within the scope and spirit shown here. For example, "equipment and instrumentalities" could include other sensors, such as could be used on boats or buildings. Those would include relative and absolute motion and/or vibration sensors, GPS, angle sensors, and many other technologies.

Figure 1A:
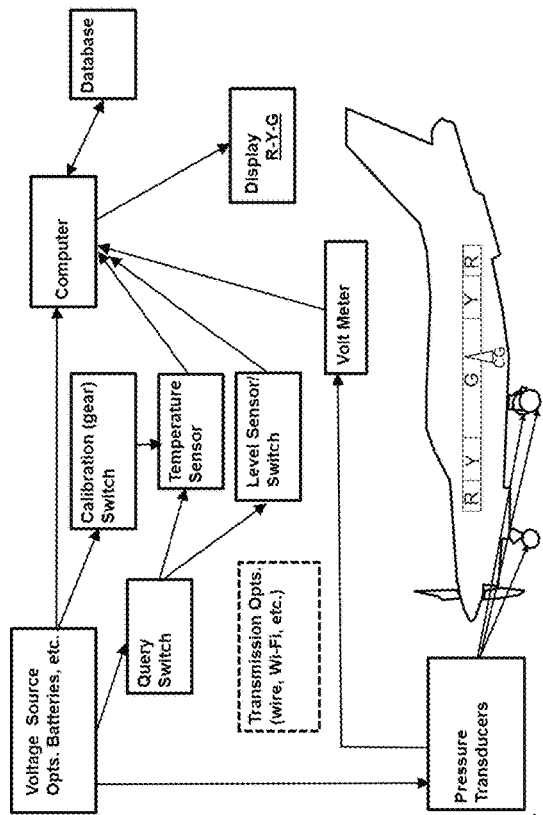
Figure 1B:
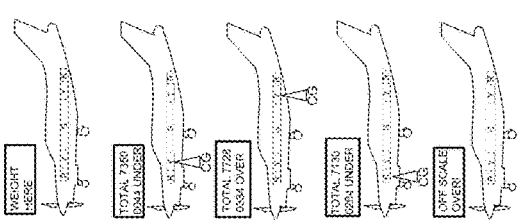

FIGS. 1 A through 1 C show sketches of the general system 30 of hardware and software for determining the weight and center of gravity location of an airplane or other vehicles, like a forklift, truck, and maritime vessel and optional displays. As stated above, an airplane flies poorly when it is overweight, and it cannot fly under full control when it is out of balance. This system informs the pilot of either condition, prior to flight. This system measures the weight of the aircraft and calculates the center of gravity; it then compares both to known limits and informs the pilot, prior to flight.

The claimed invention differs from what currently exists. This system is simpler while being more comprehensive, more aware of the aircraft's environment (temperature and inclination of terrain), and inherently more reliable than previous systems. It is also cheaper than most, and it is portable across platforms. Note that even airlines and the USAF do not have such "STAN" systems (Sum Total, Aft and Nose) systems in place. They rely on longstanding standardized procedures, complicated or imprecise technology, and/or they incorporate bulky or expensive components.

Components and features of the system 30 shown in these sketches are: Pressure transducers 101 (pressure and load measurement components such as pressure and/or load on hydraulic struts), or load cells 101A, or strain gauges (not shown) 101B (on spring gear); Voltage source 102; Voltmeter 103 (can be integrated); Computer 104; means for communication with and alerting a responsible person 105 (may be a smartphone, tablet, electronic flight bag (EFB), portable monitor, or dedicated or shared display/monitor; may be incorporated into an existing panel display (with software modifications to the existing equipment); and may be enhanced with an audio or tactile warning such as a "stick-shaker" in an aircraft 66 or additional warning); a minimum-configuration display 105A; a Database 106, derived empirically and aircraft-specific; a Temperature sensor 107; a switch 108 a "query switch" that initiates the weight and balance calculation and display; a Level sensor/switch 109 (note: in practice, a level sensor typically replaces the level switch; A Landing gear up/down switch 110 (can be separately or otherwise commanded, but is best if integrated into the existing gear up/down switch or is triggered by the physical retraction of the gear); and a control interconnection of the components 111—Wired or wireless (Bluetooth, Wi-Fi, sonic, visual/optical/photographic, and infrared interconnections, or other) transmission 111 from the data points (the pressure transducers 101 or strain gauges 101B, etc.) of the computer could be employed, to make installation less-invasive on the airframe and avoid problems with wires. Such an option may also include an independent power source (e.g., another battery) at the transmission point(s).

The Relationship among the Components is: The weight on a wheel 67 and tire 67A contact patch below an aircraft 66 can be derived from known data and landing gear's strut's internal pressure, which is captured by a pressure transducer 101 in the case of hydraulic or pneumatic struts, or a load cell 101A (not shown) or strain gauges 101B, in the case of spring gear. When the airplane 66 is level fore-and-aft and on the ground [note: an algorithm, incorporated into this invention's software, is used when the aircraft 66 is not level, to mathematically compensate for the apparent CG shift caused by the non-level attitude of the aircraft] as indicated by level sensor or level-triggered switch 109, the pressure transducer 101 or load cell 101A is energized by a voltage source 102, supplied by the aircraft's battery 68 [not shown] or other electrical source (e.g., a local battery or inductive field) and regulated to the voltage required by the pressure transducer or by other means. A voltmeter 103 captures the voltage passed into and through the pressure transducer 101 (pressure and load measurement components such as pressure and/or load), and sends this information to a computer 104, where an algorithm converts the voltage to a weight, found by querying an empirically-derived database 106 and applying temperature compensation, based on data from the temperature sensor 107. Switches 108, 110 are incorporated to keep from draining the battery 68 (or batteries), and to capture information at specific moments. The temperature must be captured at the time of calibration, as well as at the time of computation (query).

Specific to the Switches 108,110: There is a "query switch" 108, used by the pilot whenever he/she wishes to learn the weight and balance of the aircraft 66 in real time, on the ground. This switch 108 requires conscious operation by the pilot. There is a "level sensor/switch" 109, which is located upstream of the query switch 108, and which (if a switch is employed) prohibits the gathering of Weight and Balance (W&B) data when the aircraft 66 is not level in the fore-and-aft (longitudinal) orientation. Note that if the system 30 is equipped with the abovementioned level-measuring module and the algorithm that allows mathematical compensation of an off-level attitude, readings may be taken even when the aircraft 66 is not level. See below, this paragraph. This prevents readings from being erroneous, due to the natural weight shift from front to main gear when traveling uphill, or vice versa. [Note that this weight shift does not change the Center of Gravity; therefore, the weight shift must be addressed, as in this invention.] Normally encountered (mild) side-to-side (lateral) slopes, as are typically encountered on airfield ramps and taxiways, do not affect fore-and-aft loading. The level sensor(s) 109, should they detect a non-level orientation, send the actual orientation to the computer 104, which, through the use of trigonometry, adds corrections to the measurements taken at the struts 60, to allow computation of actual center of gravity, compensating mathematically (trigonometrically) for the non-level condition. The third switch is typically the "gear up/down" switch 110 already part of the aircraft 66. (In aircraft without retractable gear, calibration must be done manually, by the pilot's activating a dedicated calibration switch.) Closing this switch initiates the calibration of the W&B system. Though calibration could be achieved at either the "gear down" command (when the airplane is approaching the airport in anticipation of landing) or at "gear up" (when the airplane has just left the ground), the preferable timing of this is some moments after "gear up" is commanded, or triggered automatically by a switch that is thrown by the gear as it retracts. This timing also allows simplicity, as there is no need for a temperature sensor inside the strut 60 (see below). (In the event that the aircraft 66 does not have retractable gear, calibration can be achieved by the pilot's manually triggering a calibration switch a few seconds after liftoff; or this function could be integrated into other existing switches, e.g., at flap retraction, depending on the model of aircraft.) Though frequent calibration is most-desirable and is the likeliest to produce the most-accurate results, the pilot of a non-retractable-gear aircraft need not calibrate the system on every flight. On non-strut-equipped aircraft, there are no struts which may leak, and there is little variation in measurement due to changes in temperature. Nevertheless, more-recent calibration provides more-recent data, and recent data are preferable to ancient data.

Note: A temperature sensor 107 inside each landing gear strut 60 is ideal, but practical considerations suggest a reliable surrogate method to determine the temperature inside each strut, so the third switch is the "gear up/down" switch 110. Closing this switch initiates the calibration of the Weight and Balance system, including temperature sending. Note: Though calibration could be achieved at either the "gear down" command (when the airplane is approaching the airport in anticipation of landing) or at "gear up" (when the airplane has just left the ground), the preferable timing of this is at "gear up," triggered automatically by a switch that is thrown by the gear as it retracts, or when separately commanded by the pilot. This also allows simplicity, as there is no need for a temperature sensor inside the strut (see above), as a temperature sensor near the strut will be sufficiently accurate.

In the event that the aircraft does not have retractable gear, calibration can be achieved by the pilot's manually triggering a calibration switch a few seconds after liftoff; or this function could also be integrated into other existing switches, e.g., using the aircraft's squat switches or at flap retraction, depending on the model of aircraft.

At "gear up," the struts will be fully extended and thus less subject to stiction.

Significantly, at the time of gear retraction (takeoff), the temperature sensor will be most-closely reflecting the temperature inside the struts.

Prior to takeoff, and because of the stiction inherent in any such system and minor deviations from level in ramps and taxiways, this invention queries the pressure sensors multiple times and does a statistical sampling of the information transmitted from the struts before displaying results, but only "under the supervision of" the fore-and-aft level sensor 109 (see discussion of level compensation and explanations of mathematical compensation, above). In other words, the pilot will make the query ("press the button") which may be a separate switch or incorporated into a touch screen) while the aircraft is moving slowly on any level surface (fore-and-aft level; minor variations in side-to-side elevation of terrain are not factors in capturing the overall weight or balance). The computer receives continuous readings at small time intervals from the sensors for a short period, e.g. twenty readings, spaced 20 milliseconds apart, during periods when the level switch (if incorporated) has "granted permission" for >500 milliseconds at any time when the aircraft is in slow motion (not generating significant lift) on the ground. It loads these inputs and computes averages, rejecting gross outliers, to derive the weight and balance which it will then display. There is no practical limit to the number of queries a pilot could make prior to any given flight. When a level sensor is incorporated, these readings will be automatically adjusted for the fore-and-aft slope. Note that when the pilot queries the computer (4) for the weight and balance calculation, the stored "zero weight" or "off the ground" calibrated pressures and temperature are consulted and compared to the ready-for-takeoff pressures adjusted for temperature and attitude ("weights") at the moment of the pilot's query. The actual weight is calculated automatically in the computer from the resultant measurements.

Known weights of the "unsprung mass" of the aircraft (e.g., tires, axles, brakes and brake lines, a portion of the weight of any suspension springs and hydraulic fluid, the lower strut components, etc.) are incorporated into the calculation. Because this category includes wear items such as brake pads and tires, an average weight for these components is used. (Putting this into perspective, the weight deviations from average of such wear items are less than the tolerance in the best available and practical sensors and represent variations so small that they are ignored by the FAA in the aircraft Operating Limitations.) Weights, including unsprung mass, are added in the computer 104 and compared to known data from a database 106 to arrive at a total weight; then the sum of the weights at the main wheel axle location 67 is compared to the weight at the nose wheel location 67A, to compute the center of gravity (CG). Total weight, deviation (over or under) from maximum allowable, database-resident airframe-specific takeoff weight (MTOW), and a depiction of the CG are sent to the (display or other) means for communication with and alerting a responsible person 105. Both the "display" 105 itself and the transmission of data to the display are flexible. The display 105 incorporates the critical data—the weight of the aircraft and the location of the aircraft's center of gravity. The actual data displayed can, and in practice, typically will, include more information, e.g., the weight limit (MTOW) and difference between MTOW and actual weight; a graphical and/or numeric location of the CG, identification of the aircraft; an audio and/or tactile alarm or signal, a strobe or other warning light, etc. The essential information is the actual weight of the aircraft and the location of the center of gravity, however displayed or communicated.

The hardware for the display 105 (means for communication with and alerting a responsible person) can include warning lights, synthetic or recorded voice or audio signals for in- or out-of-specification weight and CG, or graphics or text, in addition to whatever other method of communicating the data is chosen, displayed graphically on a smartphone, a tablet, the pilot's electronic flight bag; or on the existing aircraft's screen; or on a dedicated or shared display device. The control interconnection of the components and transmission of data to the display can be hard-wired or wireless. The pilot can then read the display 105 to determine the next step—rearrange weights, remove weight, take on more weight, or not fly.

Calibration (see above) is accomplished only when the aircraft has no weight on the wheels. This can be when the aircraft is up on jacks with the wheels hanging freely or, typically, when it is in the air, immediately after takeoff. Frequent calibration helps compensate for variations in wear and maintenance or undetected minor damage, including variations in the amount of fluid in the struts, contamination, or differences in base pressure in the gas therein.

Gases, such as the gas in the landing gear strut, expand at a predictable rate (see note following) with increases in temperature, but the temperatures at the times of measurement must be known, and the expansion/contraction compensated for, to get meaningful comparisons. Note: All gases follow $PV=NRT$, where P is the pressure, V is the volume, N is the number of molecules, R is a constant, and T is the temperature in degrees Kelvin (Celsius temperature+273). The volume of the strut's chamber at zero load is recorded in the computer's memory. (Note that when the calibration takes place, no weight will be on the wheels, and the struts will be at full extension, reflecting a mechanical constant for each strut.) Changes in pressure will be compared to known changes in the struts' internal volumes and will also change, proportional to change in temperature (in degrees Kelvin). Also note that if the pressure in the strut is too low to prevent bottoming of the strut when the aircraft is loaded, the weight derived from that strut (as well as the calibration value) will be inaccurate, and the overall weight and balance calculations will not be usable. (This condition is analogous to the caveat in Hooke's' Law: "When an elastic body is distorted within its limit of elasticity, the stress called out by the distortion, tending to restore the body to its original condition, is proportional to the distortion.") A visual check during the preflight inspection is required in the Pilot Information Handbook (PIH) or Pilot's Operating Handbook (POH), the operating manual for the aircraft. A fully compressed strut would be discovered on the preflight inspection and is cause to cancel the flight and would also likely result in this system's displaying an obviously "light" weight reading or (under certain plausible circumstances) an anomalous CG location. An alert pilot would interpret this as a serious malfunction.

If the system is to be installed on existing aircraft, there is some advantage in transmitting the data from its points of collection (at the struts) to the computer without the use of wires. Therefore, a control interconnection of the components wireless transmission system 111 using Bluetooth, Wi-Fi, sonic, and/or infrared interconnections or other radio communication may be preferred. Because the transmitters would require power, a small battery or inductive power source would be included in this system.

Figure 2:
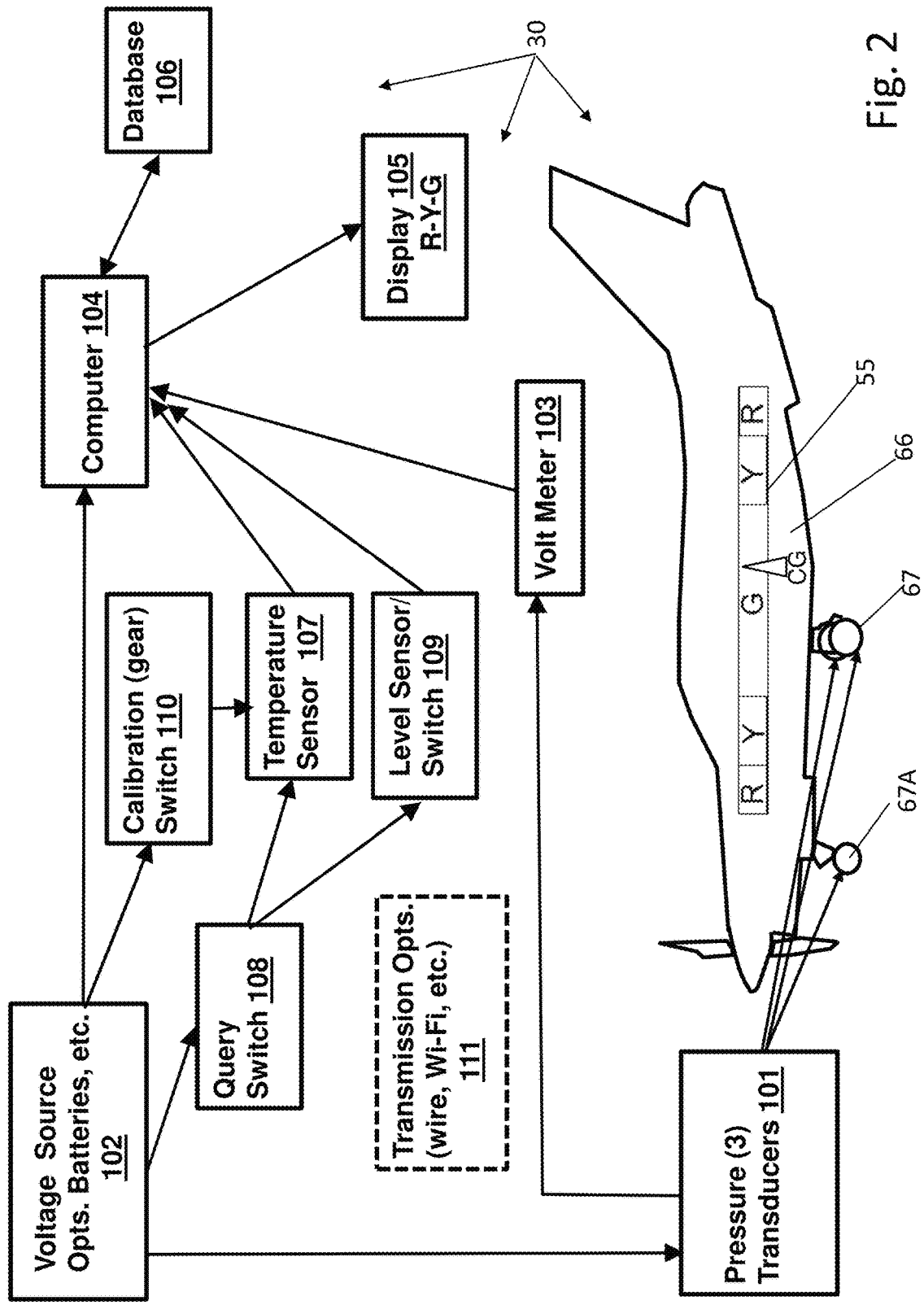
FIG. 2 is a sketch of the general system of hardware and software for determining the weight and center of gravity location of an airplane or other vehicles, like a forklift, truck, and maritime vessel.

FIG. 2 is a sketch of the general system 30 of hardware and software for determining the weight and center of gravity location of an airplane or other vehicles, like a forklift, an over the road truck, an off the road construction vehicle, and a maritime vessel. The specifics were described in FIG. 1. Note well that on the display 105, 105A the MTOW [Maximum Take Off Weight—the design limit] is compared to the actual weight, and the difference is shown; further, the Center of Gravity (CG) is indicated on the display screen. Also, the pressure transducers 101 (here 3) at each strut shows the impact of the weight at each strut. The system 30 indicates the inputs from the pressure transducers 101 and the various sensors 107,109 into the computer 104 and read on the displays 105, 105A. One also can note the relationship of nose wheels 67 and tires 67A normally located under the nose of the aircraft (measurement may also be taken at tailwheel on aircraft 66 so equipped) and display 55 of the actual measured weight of the aircraft and the universally-recognized colors (RED—Out of Range, YELLOW—caution, going out of CG range but acceptable, and GREEN-acceptable/go) and relative positions of the Center of Gravity (CG) give the pilot an instant and visual check on calculations, and verify that the results arrived at in those calculations (e.g. aircraft weight at that moment and location of the CG) are correct.

FIGS. 3 A through 3 C are sketches of displays 105, 105A showing the system results in a visual/optical/photographic, and audible form. FIG. 3 A was described above. FIG. 3 B is a minimum-configuration display, as opposed to one of the other samples in FIG. 3 A, or what would show on an existing screen in the cockpit, or on a smartphone app. The minimum information the pilot needs are these two: total weight and position of the center of gravity (CG). "311 lbs. under limit" saves the pilot time; he does not have to compare the actual weight (7083 pounds) to the Maximum (permissible) Takeoff Weight (MTOW) of 7394 pounds. The "F |_____^_____| R" line shows that the CG is located near centered between the Front (F) and Rear (R) of the CG envelope (the range into which the CG must fall for safe flight). The actual configuration of the display is irrelevant; all that is necessary is the weight and balance information. Aircraft manuals often define the CG limits in terms of percentages of Mean Aerodynamic Chord (MAC). Those data are programmed into this system's algorithm, and the display shows a window that tells the pilot what he needs to know: HOW MUCH DOES THE AIRCRAFT WEIGH, and WHERE IS THE CG, RELATIVE TO ITS LIMITS? There is nothing useful to most (non-test) pilots in knowing that "the CG is at 26% of MAC," when all he needs to know is that it's between the limits, say, 21% to 26.6%. All the pilot wants to know is if he/she is within the limits; and if he/she is out, whether he is too heavy or too far forward or too far aft. Even if he/she is in limits, knowing that he is near the front or rear limit allows the pilot to, for instance, change the passengers' seat assignments or rearrange cargo, to optimize the flight characteristics. One notes that many types of displays can be used, and it can be in any useful form, and the plethora of displays available (minimal digital display, such as in FIG. 3 B, or anything one can imagine, to appear on a tablet, smartphone, EFB (electronic flight bag), or an existing glass panel on the existing instrument panel) guarantees wide artistic (but not informational) latitude. As mentioned in the NOTE in 3B, an overweight or out-of-CG warning could also be augmented by an auditory signal such as a horn, buzzer; or an additional visual/photographic/optical signal such as a flashing light; or a tactile signal, such as a stick shaker etc. Preparing for FIG. 3 C one understands that the center of gravity (CG) of the object is always the same, whether on level or sloped terrain. The weight shift that is apparent when on an incline is what is being compensated for, to find the CG under these circumstances. Note also that F is a point, and that F is at the opposite end of the very short line FD (marked "correction") from D. FIG. 3 C demonstrates the necessity of applying a correction factor to the weights on the wheels, when the aircraft is on an incline. The slope (slope angle E) causes a weight shift that is discerned by the pressure transducers, but the incline does not change the center of gravity of the aircraft. Therefore, the level sensor 109 is incorporated to determine the angle of the slope on which the aircraft's weight and CG are being measured. That angle is communicated to the computer 104, which then compensates for this weight shift. Note that the weight shift due to the incline does not affect the readings of the total weight of the aircraft; the weight shift simply gives the appearance of a CG shift, which the level sensor 109 and computer 104 then compensate for in the display 105 output.

FIG. 4 A is an enlarged view of the display 105 (Described above) and FIG. 4 B shows the advantages 100 of the system. The advantages 100 are also described above in several paragraphs. Note also display 55 of the actual measured weight of the aircraft and the universally-recognized colors (RED—Out of Range, YELLOW—caution, going out of CG range but acceptable, and GREEN-acceptable/go) and relative positions of the Center of Gravity (CG).

Figure 5:
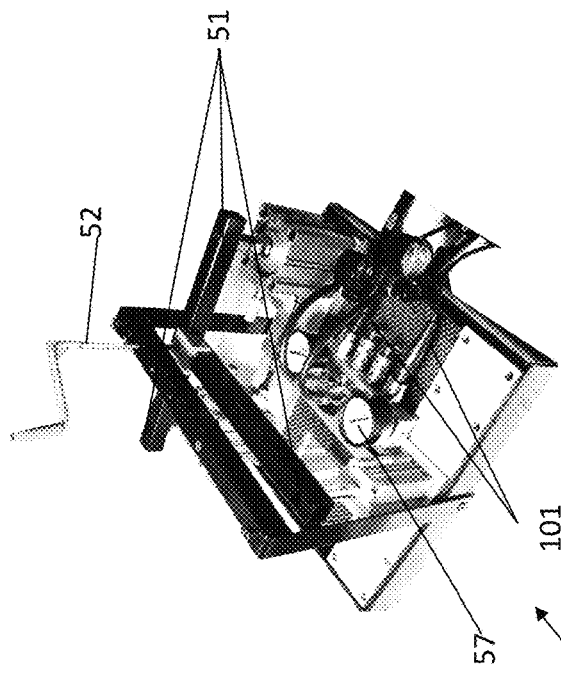
FIGS. 5A through 5E are sketches of electrical and pneumatic mock-ups or prototypes of the systems.
Figure 5:
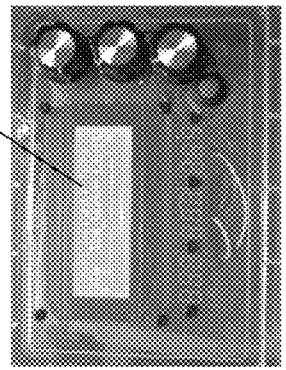
Figure 5:
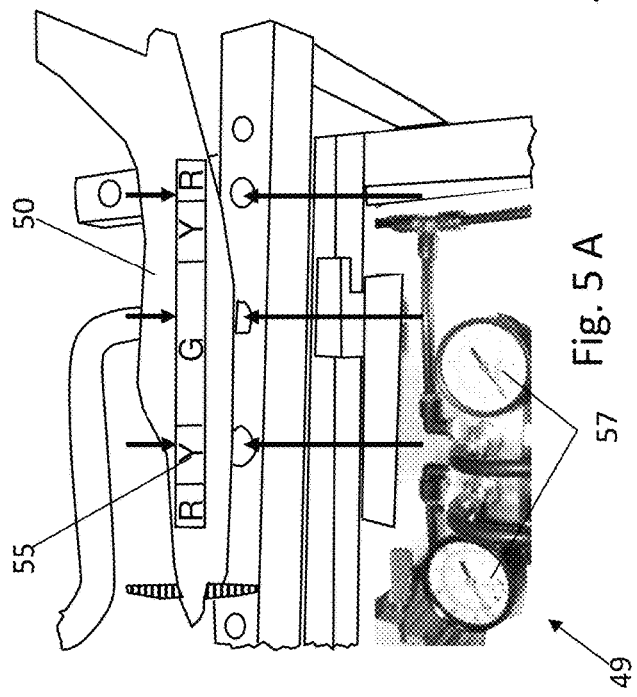
Figure 5:
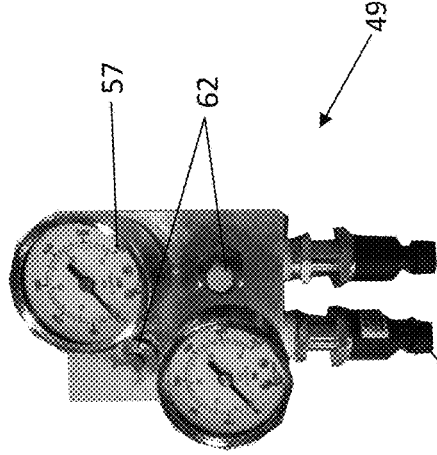
Figure 5:
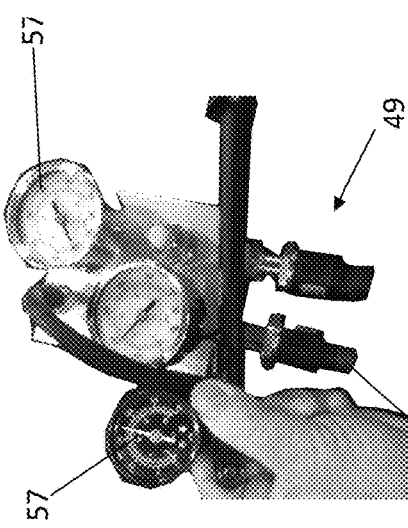
Figure 8:
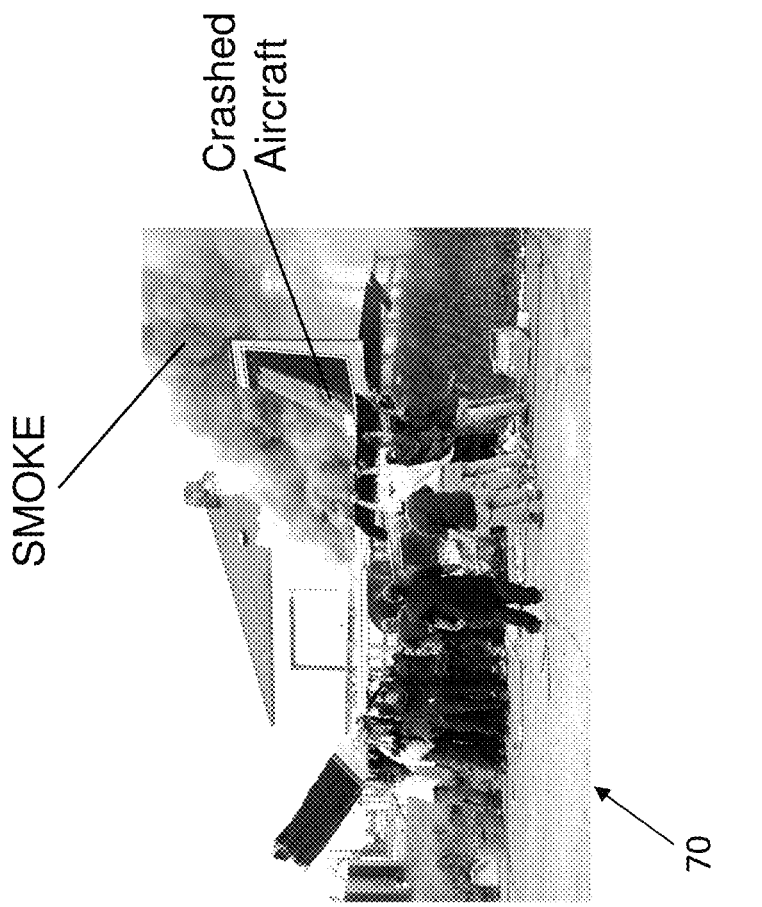
FIGS. 8A and 8B are sketches of an aircraft crash where excess weight and an aft Center of Gravity resulted in disaster.
Figure 8:
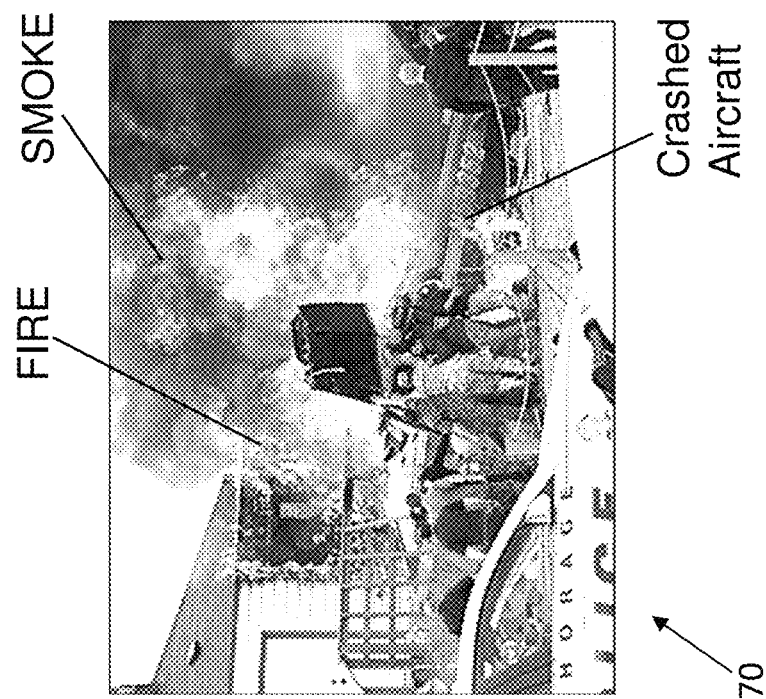

FIGS. 5 A through 5 E are sketches of electrical 48 and pneumatic 49 mock-ups or prototypes of the systems. FIGS. 5 A and 5 B are of a demonstrator mock-up 48 set-up as something people could manipulate and see the changes in wheel voltages (not visible in the actual product) and algorithm-derived weights. As the weights and orientation of the aircraft change, the observer would see the weight and balance calculation change apace. One notes the pneumatic cylinders (surrogates for struts) 51 for demonstration; the mechanical crank 52 varies pressure for demonstration; R-Y-G display 55; pressure transducers 101; and pressure gauge 57. It is simply an interactive model. FIGS. 5 C and 5 D are pneumatic mock-ups 49 of a test fixtures made to test pressure transducers. Each transducer 101 (the black things sticking out are each at the end of a chamber, in parallel with one pressure gauge 57 and one fill valve 62). FIG. 5 C shows pressure on the gauge 57, a result of being energized by a small hand pump (which has its own gauge). In FIG. 5 C, the column on the left has pressure; the one on the right does not. In FIG. 5 D, the components 57, 101, 62 are more-clearly shown. There were built both electrical 48 (not shown) and pneumatic 49 mockups: There were two working test fixtures; one is pneumatic 49 and more suitable for demonstration of the concept, while the other (all electric 48) is easier to transport. Also there is designed and built a working pressure-test fixture 49, incorporating the actual fill valves used on an exemplar TBM (MS28889-2) and many other aircraft using struts, which can audition whatever pressure transducers are to be used on the airplane. The fixture is shown with gauges and exemplar transducers to help simulate and calibrate the chosen pressure transducers 101. FIG. 5 E is an electrical mock-up 48 with an alternate display 105A demonstrated.

FIGS. 6 A through 6 E are sketches of actual aircraft struts 60 where the system sensors and controls will gather empirical data of the aircraft weights. These are various arrangements of hydraulic struts 60. The small yellow cap 62 (color not shown) seen on each valve protects the fill valve, in this case part number MS28889-2. It is apparent from these sketches that there are many configurations, and that no universal system for tapping into these valves exists. FIGS.

6A and 6B may have room for a fitting such as shown in FIG. 7; FIG. 6C may be better accessed with a banjo or other fitting. FIG. 6E is a detail label 61 found on all modern struts that shows the normal (uncompressed) pressure to which this particular strut should be inflated.

FIG. 7 is a sketch of a conceptual strut 65 to accept the transducers 101 and sensors for the system 30 of hardware and software for determining the weight and center of gravity location of an airplane or other vehicles. Also, one notes the (commonly) 1/2-20 threaded fitting to thread into. As mentioned in other places, that fitting could be a banjo, with a suitable hose to the pressure transducer and/or filler, depending on space available. ("AST 4300" is merely an example of one possible pressure transducer; part number, location, and dimensions may differ). Additional progress and certification will require a systems integrator familiar with developing certifiable code for a computer that will be doing the work on the airplane, in the eventual (certified) state, plus the system will have an engineer familiar with existing certified components (e.g., suitable computer and pressure transducers). The system will enable non- or minimally invasive data gathering. Signal routes (Where the control interconnection of the components/wires be run and/or wireless communication will transmit data from the sensors and transducers at the struts to the computer) will vary by aircraft model. Access to actual nose and gear struts will permit the mechanical test equipment to be installed and allow one to derive an empirical lookup table as well.

FIGS. 8A and 8B are sketches of an aircraft crash 70 where an overloaded aircraft with an incorrect Center of Gravity resulted in this disaster. This is a nose wheel aircraft (a Cessna U206F), but the tail is on the ground. Its extreme rear CG is still evident. The rescuers had to lift the tail off the ground to help extricate the victims. (Photos are by the Anchorage Daily News Copyright 2010). The air disaster crash 70 was afterward determined to be result of weight and balance exceedance problems.

The details mentioned here are exemplary and not limiting. Other specific components and manners specific to describing a system of hardware and software for determining the weight and center of gravity location of an airplane or other vehicles, like a forklift, an over the road truck, an off the road construction vehicle, and a maritime vessel can be added as a person having ordinary skill in the field of the art of systems for determining a center of gravity and weight balancing activities and similar devices and their uses well appreciates.

OPERATION OF THE PREFERRED EMBODIMENT

The system 30 of hardware and software for determining the weight and center of gravity location of an airplane or other vehicles, like a forklift, truck, and maritime vessel has been described in the above embodiment. The manner of how the device operates is described below. One notes well that the description above and the operation described here must be taken together to fully illustrate the concept of the system 30. The preferred embodiment of a system of hardware and software for determining the weight and center of gravity location of an airplane or other vehicles, like a forklift, truck, and maritime vessel is comprised of: (a) a set of pressure transducers (on hydraulic struts), or load cells or strain gauges (on spring gear); (b) level/tilt and temperature sensors; (c) a voltage source; (d) a voltmeter (can be integrated); (e) a computer; (f) a display (may be a smartphone, tablet, EFB, portable monitor, or dedicated or shared monitor/display; may be enhanced with an audio or other visual or tactile warning such as a "stick-shaker" in an aircraft); (g) an empirically derived database; (h) a temperature sensor; (i) a (set of) switch(es):level sensor/switch, landing gear up/down switch (can be separately commanded, but is best if integrated into the existing gear up/down switch or is triggered by the physical retraction of the gear), and a switch to query for the weight and balance calculation and display; (j) a control interconnection of the components—wired or wireless (Bluetooth, Wi-Fi, sonic, and infrared interconnections, or other) transmission from the data points (the pressure transducers and/or strain gauges, etc.) to the computer could be employed, to make installation less-invasive on the airframe and avoid problems with wires; and (k) an independent power source (e.g., another small battery) at the transmission point wherein the system hardware and software can be used for determining the weight and center of gravity location of an airplane or other vehicle, like a forklift, an over the road truck, an off the road construction vehicle, and a maritime vessel.

How the Invention Works: The pneumatic pressure in each strut is a reliable surrogate for the weight on the wheel. The pressure in each of its landing gear struts (note: in applications that do not employ hydro-pneumatic struts, other transducers, load cells, or strain gauges, or even visual or bending sensors, etc., can be substituted; the principle is identical) is correlated to the weight being borne by that wheel. The pressure transducer (see note for alternative sending devices) presents varying electrical resistance, according to the pressure in the strut. This resistance reduces, in a predictable manner, the voltage through the pressure transducer; this voltage is then transmitted to the computer, which may calculate directly or consult a lookup table (empirically derived and unique to the aircraft type and model, as equipped), to derive a "raw weight" on that wheel. The temperature at the time of calibration is then compared to the temperature of the current query, and the raw weight is then adjusted by the computer to accommodate output according to the difference in temperature. The computer then calculates the weight on each wheel, adds the unsprung weights, sums the weights, and thus derives the aircraft's total weight. The proportion of the weights on the main wheels and the other wheel (nose wheel or tailwheel) is inversely proportional to the distance of the center of gravity from those axle centers. (There is one axle in the nose wheel or tailwheel, and another axle centerline runs through both main wheels.) The computer, through its algorithms and in conjunction with the database, then computes the weight of the aircraft and the position of the CG in the fore- and aft axis. (Positions relative to both fore-and-aft and left/right axes can be computed, but fore/aft only is relevant to aircraft; other applications may benefit from knowledge of the addition of a left-right CG location, and a similar algorithm can be used in those applications). Knowing both the total weight of the aircraft and the position of the CG, the pilot can either shift weight, add weight, or remove weight, to optimize the flight characteristics.

How to Make the Invention: A person would incorporate pressure transducers or other devices such as load cells, strain gauges, bending gauges, optical, sonic, or other sensors into the landing gear struts of a subject airplane, supply regulated DC voltage to them, and record the resistance measured at any number of known weights on that strut, by simultaneously measuring the voltage drop at various known weights (the airplane's wheels could be sitting on scales during data gathering). At the same time as these pressures were queried, someone would record the temperature of the strut. A database would be developed through multitudes of empirical measurements, to allow for manufacturing tolerances and (unexpected but possible, due to progressive-wound springs, for instance) nonlinear responses to various weights. The computer would interpret each strut's information, based on that data table, adjust the raw data for the difference in temperature at the time of calibration and the time of the pressure query, and compute the total weight of the airplane. The CG would also be computed, based on the weights data and adjusted by input from the level sensor, in the event that the measurements were not taken on a level surface. These data would then be sent by the computer to the display (see display, above).

Knowing the instrumented weight and balance information, the pilot could then (compare his/her mandatory preflight calculations to check these and) determine whether the flight would be legal and safe.

All elements except the type of sensor and method of data transmission are mandatory. Additional enhancements could involve a control interconnection of the components—wireless transmission of the sensor data from the pressure transducers to the computer, and from the computer to the display. Examples could include wires, Bluetooth or other short-range radio transmissions, employment of onboard Wi-Fi, sonic, and infrared interconnections, or a combination of these. The algorithm could be further sophisticated to compensate for CG design shifts at various aircraft weights, fuel used in flight, or the possible movement of passengers, e.g., to a lavatory. The pressure transducers could be replaced or augmented by other sending units (e.g., strain gauges, laser or sonic measuring equipment, bending or angle-measuring tools and methods, GPS data, etc.) to enhance, confirm, or make possible other measurements on mobile or stationary structures, such as a forklift, an over the road truck, an off the road construction vehicle, and a maritime vessel, boats, or large structures such as radio towers or buildings, to provide long-term or spot monitoring. Additional sensors could be added, such as solid-state gyros, mercury switches, location sensors, load cells, or GPS location devices, to record or give notice/warning of listing, rolling, or leaning. Such systems could enhance efficiency and safety of commercial trucks and forklifts, or in maritime applications such as ferries. Strain or position gauges can be run through a similar algorithm tailored to the purpose, and thus could warn of shifts in position or orientation, or changes in loading, to monitor power and radio transmission towers, bridges, or buildings.

How to Use the Invention: Pilots are often victims of inaccurate information. The fuel gauges may be inaccurate; the "line boy" may report an incorrect loading of fuel; passengers may underestimate their weights; the pilot may misjudge the weights of various pieces of baggage or cargo; passengers may load cargo unknown to the pilot; passengers may change from their assigned seats or rearrange luggage or cargo after the pilot has taken his/her place in the cockpit. Thus, in their required preflight calculations, pilots may be using incorrect data. Further, even with perfect and complete data, pilots may make errors in data entry or calculation. By employing this system, the pilot could immediately learn of data or calculation errors and be warned of a potential out-of-limits or otherwise suboptimal loading condition. This system provides a real-time check on those data and calculations, and allows repositioning of weights (passengers, luggage, cargo) off-loading or reloading, prior to the flight.

Many uses are anticipated for the system 30 of hardware and software for determining the weight and center of gravity location of an airplane or other vehicles, like a forklift, truck, and maritime vessel. Some examples, and not limitations, are shown in the following Table.

| ITEM | DESCRIPTION |
| --- | --- |
| 1 | All forms of private and commercial aircraft |
| 2 | Military, farming, and homeland defense equipment susceptible to over-turning (Warnings could issue in real time.) |
| 3 | Ferry and sightseeing boats and maritime sea craft |
| 4 | Industrial machinery such as forklift trucks, trailers, man-lifts, cherry pickers |
| 5 | Construction equipment such as front-end loaders, backhoes, and other off-the-road vehicles |

With this description it is to be understood that the system of hardware and software for determining the weight and center of gravity location of an airplane or other vehicles, like a forklift, truck, and maritime vessel is not to be limited to only the disclosed embodiment of system. The features of the system of hardware and software for determining the weight and center of gravity location of an airplane or other vehicles or (in a limited way already described) structures are intended to cover various modifications and equivalent arrangements included within the spirit and scope of the description.

While certain novel features of this invention have been shown and described and are pointed out in the annexed claims, this is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. Various features and aspects of the disclosed embodiments can be combined with or substituted for one another to form varying modes of the disclosed inventions. Thus, it is intended that the scope of at least some of the present inventions herein disclosed should not be limited by the disclosed embodiments described above.

The terms recited in the claims should be given their ordinary and customary meaning as determined by reference to relevant entries (e.g., definition of "plane" as a carpenter's tool would not be relevant to the use of the term "plane"

when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A system of hardware and software for determining a weight and center of gravity location of a vehicle comprised of:
   (a) a single pressure and/or another load measurement component located at each individual point of contact of a wheel and ground;
   (b) a temperature sensor and a level sensor to measure an angle for the vehicle;
   (c) a voltage source;
   (d) a voltmeter or measurement device;
   (e) a computer;
   (f) a means of communicating with and alerting a responsible person;
   (g) a set of switches; and
   (h) an interconnection for control of the components;
   wherein the system hardware and software can be used for determining the weight and center of gravity location of a vehicle and can independently and collectively indicate and indicate the weight distributed at each wheel while on the ground.

2. The system of hardware and software for determining the weight and center of gravity location of a vehicle in claim 1 wherein the vehicle is selected from the group consisting of an aircraft, a forklift, an over the road truck and trailer, an off the road vehicle, and a maritime vessel.

3. The system of hardware and software for determining the weight and center of gravity location of a vehicle in claim 1 wherein the pressure and/or load measurement component is selected from the group consisting of a set of pressure transducers, a set of load cells, a set of linear transducers, a set of strain gauges, and a set of visual/optical gauges.

4. The system of hardware and software for determining the weight and center of gravity location of a vehicle in claim 1 wherein the voltmeter is selected from the group consisting of an integrated voltmeter and a discrete voltmeter.

5. The system of hardware and software for determining the weight and center of gravity location of a vehicle in claim 1 further comprised of warning features.

6. The system of hardware and software for determining the weight and center of gravity location of a vehicle in claim 5 wherein the warning features are selected from the group consisting of an audible alarm, a flashing light, a visible warning, and a tactile warning.

7. The system of hardware and software for determining the weight and center of gravity location of a vehicle in claim 1 wherein the means of communicating with and alerting a responsible person is selected from the group consisting of a smartphone, a tablet, an electronic flight bag, a portable monitor, and a dedicated and/or shared monitor screen.

8. The system of hardware and software for determining the weight and center of gravity location of a vehicle in claim 1 wherein the set of switches is selected from the group consisting of level sensor/switches, landing gear up/down or squat switches, flap control switches, and a query switch.

9. The system of hardware and software for determining the weight and center of gravity location of a vehicle in claim 1 wherein the interconnection for control of the components is selected from the group consisting of a hard wired and a wireless interconnection.

10. The system of hardware and software for determining the weight and center of gravity location of a vehicle in claim 9 wherein the wireless interconnection is selected from the group consisting of Bluetooth, Wi-Fi, sonic, visual/photographic/optical, and infrared interconnections.

11. The system of hardware and software for determining the weight and center of gravity location of a vehicle in claim 1 wherein the voltage source is a discrete and independent battery, an onboard power system, and an inductive source.

12. The system of hardware and software for determining the weight and center of gravity location of a vehicle in claim 1 further comprised of additional sensors and switches.

13. The system of hardware and software for determining the weight and center of gravity location of a vehicle in claim 12 wherein the additional sensors are selected from the group consisting of solid-state gyros, mercury switches, location sensors, load cells, GPS location sensor devices, and sensors that record and give warning of listing, rolling, leaning, pressure, strain, and load.

14. A system of hardware and software for determining the weight and center of gravity location of an aircraft comprised of:
(a) a single pressure transducer and/or other load measurement component located at each individual landing gear of an aircraft with each of the single measurement components placed to measure at the point of contact between the aircraft and ground;
(b) a temperature sensor and a level sensor to measure a temperature of the measurement components and an angle and variation from level for the aircraft;
(c) a voltage source;
(d) a voltmeter;
(e) a computer;
(r) a means for communication with and alerting a responsible person;
(g) a set of switches; and
(h) a control interconnection of the components;
wherein the system hardware and software can be used for determining the weight and center of gravity location of the aircraft and can indicate and communicate weight distributed at each landing gear of the aircraft while on the ground.

15. The system of hardware and software for determining the weight and center of gravity location of an aircraft in claim 14 wherein the means for communication with and alerting a responsible person is selected from the group consisting of a smartphone, a tablet, an electronic flight bag, a portable monitor, a dedicated and/or shared monitor screen, an optical device, and an audio device.

16. The system of hardware and software for determining the weight and center of gravity location of an aircraft in claim 14 wherein the set of switches is selected from the group consisting of level sensor/switches, landing gear up/down switches, flap or squat switches, and a switch to query the system.

17. The system of hardware and software for determining the weight and center of gravity location of an aircraft in claim 14 wherein the voltage source is selected from the group consisting of an independent battery, an aircraft's onboard power systems, and an inductive system.

18. A system of hardware and software for determining the weight and center of gravity location of a maritime vehicle comprised of:
(a) a level measurement component;
(b) a voltage source;
(c) a voltmeter;
(d) a computer;
(e) a display or notification system;
(f) a set of switches; and
(g) an interconnection for control of the components
wherein the system hardware and software can be used for determining the weight and center of gravity location of a maritime vehicle.

19. The system of hardware and software for determining the weight and center of gravity location of a maritime vehicle in claim 18 wherein the level measurement component is selected from the group consisting of level sensors, position sensors, accelerometers, gyros, pressure sensors, load sensors, bending sensors, and strain sensors.

20. The system of hardware and software for determining the weight and center of gravity location of a maritime vehicle in claim 18 wherein the voltage source is selected from the group consisting of a voltage system of the maritime vessel, an independent battery, and an inductive system.

* * * * *